Patented June 19, 1945

2,378,693

UNITED STATES PATENT OFFICE 2,378,693

COAGULANT FOR SYNTHETIC RUBBER LATICES

Charles F. Fryling, Akron, Ohio, assignor to The B. F. Goodrich Company, New York, N. Y., a corporation of New York No Drawing. Application July 30, 1941, Serial No. 404,659

10 Claims. (Cl. 260—23)

This invention relates to the coagulation of synthetic rubber latices, and particularly to the use of a specific kind of a coagulant which deposits the synthetic rubber in a form which expedites further operations such as washing and drying.

It is well known that by the polymerization in the form of an aqueous emulsion of a butadiene either alone or in the presence of monomers copolymerizable therewith stable dispersions may be obtained. In a majority of cases, the synthetic rubber latex is coagulated, washed, and dried to form a massive product which may be further treated in much the same manner as natural rubber.

If common plantation practice is applied to the coagulation of synthetic rubber latex rather than natural rubber latex, the product obtained is in the form of a coherent mass. Thus if acid in dilute solution is added to a synthetic rubber latex containing soap as the emulsifying agent, the coagulum coheres upon standing into an amorphous body which can be lifted from the water in one piece. Such a mass is very difficult to wash, and it takes a long time completely to remove the water therefrom. Agitation of the latex during an acid coagulation breaks up the coagulum to a certain extent, but the particles are sticky and readily cohere when the stirring is stopped.

It is an object of this invention to provide a coagulant which will precipitate synthetic rubber from an aqueous dispersion in the form of discrete particles which have little tendency to cohere. It is a further object of this invention to provide a coagulant which effects complete coagulation in a short space of time.

I have found that these and other objects may be accomplished by employing as the coagulant a water-soluble aluminum salt. Aluminum sulfate, an inexpensive and readily available salt, is the preferred material, although other water-soluble aluminum salts such as aluminum chloride, aluminum nitrate, and aluminum acetate may be employed if desired. Double aluminum salts which ionize to yield aluminum ions such as potassium aluminum sulfate, sodium aluminum chloride, etc., may also be employed.

The use of aluminum salts is particularly advantageous when the synthetic rubber latex contains as the emulsifying agent a water-soluble soap such as sodium oleate, potassium palmitate, sodium myristate, sodium laurate, or other alkali metal salts of higher fatty acids which form insoluble soaps with aluminum. In this case, coagulation with an aluminum salt is believed to be mainly due to destruction of the emulsifying agent through the formation of the insoluble aluminum soap. The use of at least 50% excess of aluminum salt over that theoretically required to react with the soap is desirable to insure rapid and complete coagulation. Aluminum salts are also extremely useful coagulants for synthetic rubber latices containing synthetic saponaceous emulsifying agents such as hymolal sulfates and aryl sulfonates of the type represented by sodium lauryl sulfate and sodium isopropyl naphthalene sulfonate. The coagulation of synthetic latices containing non-electrolytic emulsifying agents such as gelatin, albumen, and aromatic compounds rendered soluble by the presence of a chain of

groups terminating with a hydroxyl group may also be effected by the coagulants herein described, although considerably larger amounts of salt must be employed than where the coagulation is effected pricipally by formation of an insoluble aluminum soap.

Although coagulation occurs when the coagulant is added in solid form, in commercial operations the aluminum salt is ordinarily mixed with the latex in the form of an aqueous solution. A 1% to 10% solution of $Al_2(SO_4)_3 \cdot 18H_2O$ in water is very satisfactory, although the concentration is in no way critical. Any of the ordinary methods of coagulation may be employed when an aluminum salt is such as the coagulant. The synthetic rubber latex and the solution of aluminum salt may be brought together in a coagulating nozzle such as that described in the copending application of Waldo L. Semon, Serial No. 367,821, filed November 29, 1940, in which turbulent intermingling of the streams is effected. If desired, the latex may be run in a small stream into an aqueous solution of aluminum salt being stirred sufficiently to secure deposition of the coagulum in the form of crumbs of the desired size. Alternatively, the coagulant may be run into the latex. This alternative is not preferred, however, since a coagulum of somewhat larger particle size which is consequently more difficult to wash is obtained.

As a specific example of a preferred method of coagulating a synthetic rubber latex with an aluminum salt, 80 pounds of $Al_2(SO_4)_3 \cdot 18H_2O$ were dissolved in 400 gal. of water and placed in a large vat provided with a paddle-type stirrer. Synthetic rubber latex prepared by the emulsion copolymerization of butadiene and acrylonitrile in the presence of about 5% based on the monomers of soap was run into the vessel at such a rate that about a ton of coagulum was formed in an hour. The coagulating bath was stirred throughout the addition of the synthetic rubber latex to maintain a moving liquid surface upon which the latex could drop, thereby preventing the latex from falling on partially coagulated rubber and forming lumps. During the last part of the addition, the bath thickened somewhat, so steam was admitted beneath the surface of the bath to assist in the agitation and to heat the bath to about 60° C. The coagulum was in the form of fine crumbs which did not cohere when the stirring was stopped and which did not adhere to the stirrer or the walls of the vat during the coagulation. The desirable characteristics of the coagulum appeared to be due to the fact that an aluminum salt was used, for coagulation with water-soluble salts of other polyvalent metals such as zinc and lead produced coagula similar to those obtained with an acid coagulant which cohered and were difficult to wash and dry.

The same desirable results are obtained by coagulating synthetic rubber latices formed by the emulsion polymerization of other butadienes-1,3 such as isoprene, piperylene, 2,3-dimethyl-butadiene, chloroprene, or other homologues or analogues of butadiene-1,3 which enter into polymerization reactions in essentially the same manner, either alone or in admixture with each other and/or other monomers copolymerizable therewith such as styrene, isobutylene, acrylonitrile, methyl methacrylate, methyl acrylate, methyl vinyl ether, methyl vinyl ketone, and other unsaturated hydrocarbons, esters, ethers, and ketones.

Although I have herein disclosed a specific embodiment of my invention, I do not intend to limit the invention solely thereto for it will be obvious to those skilled in the art that other coagulating procedures may be employed without departing from the spirit and scope of the invention as defined in the appended claims.

I claim:

1. The method of coagulating a stable aqueous polymer dispersion prepared by the polymerization in aqueous emulsion of a polymerizable material consisting predominately of a butadiene-1,3, which comprises mixing a water-soluble aluminum salt with said dispersion whereby coagulation of the dispersion is effected and discrete, substantially non-coherent particles of rubbery polymer are formed.

2. The method of coagulating a stable aqueous polymer dispersion prepared by the polymerization in aqueous emulsion of a polymerizable material consisting predominately of butadiene-1,3, which comprises mixing a water-soluble aluminum salt with said dispersion whereby coagulation of the dispersion is effected and discrete, substantially non-coherent particles of rubbery polymer are formed.

3. The method of coagulating a stable aqueous polymer dispersion prepared by the polymerization in aqueous emulsion of a mixture of butadiene-1,3 and a lesser amount of a monomer copolymerizable therewith in aqueous emulsion, which comprises mixing a water-soluble aluminum salt with said dispersion whereby coagulation of the dispersion is effected and discrete, substantially non-coherent particles of rubbery material are formed.

4. The method of coagulating a stable aqueous polymer dispersion prepared by the polymerization in aqueous emulsion of a mixture of butadiene-1,3 and a lesser amount of a monomer copolymerizable therewith in aqueous emulsion, which comprises mixing an aqueous solution of a water-soluble aluminum salt with said dispersion whereby coagulation of the dispersion is effected and discrete, substantially non-coherent particles of rubbery material are formed.

5. The method of claim 4 wherein the aluminum salt is aluminum sulfate.

6. The method of claim 4 wherein the dispersion is prepared by the polymerization in aqueous emulsion of a mixture of butadiene-1,3 and a lesser amount of acrylonitrile.

7. The method of claim 4 wherein the dispersion is prepared by the polymerization in aqueous emulsion of a mixture of butadiene-1,3 and a lesser amount of styrene.

8. The method of coagulating a stable aqueous polymer dispersion prepared by the polymerization in aqueous emulsion of a mixture of butadiene-1,3 and a lesser amount of a monomer copolymerizable therewith in aqueous emulsion in the presence of a water-soluble soap as the emulsifying agent, which comprises mixing said dispersion with an aqueous solution of an aluminum salt whereby coagulation of the dispersion is effected and discrete, substantially non-coherent particles of rubbery material are formed.

9. The method of claim 8 wherein the dispersion is prepared by the polymerization in aqueous emulsion of a mixture of butadiene-1,3 and a lesser amount of acrylonitrile; and the aluminum salt is aluminum sulfate.

10. The method of coagulating a stable aqueous polymer dispersion prepared by the polymerization in aqueous emulsion of a mixture of butadiene-1,3 and a lesser amount of a monomer copolymerizable therewith in aqueous emulsion, which comprises adding said dispersion to an aqueous solution of a water-soluble aluminum salt and stirring the solution during the addition whereby coagulation of the dispersion is effected and discrete, substantially non-coherent crumbs of rubbery material are formed.

CHARLES F. FRYLING.